(12) United States Patent
Piccin et al.

(10) Patent No.: US 9,352,490 B2
(45) Date of Patent: May 31, 2016

(54) METHOD FOR PRODUCING AN INTERIOR TRIM FOR A MOTOR VEHICLE, INCLUDING A SUBSTRATE AND A COATING HAVING THE APPEARANCE OF WOOD

(75) Inventors: Hugo Piccin, Paris (FR); Nathalie Durand, Cergy (FR)

(73) Assignee: Faurecia Interieur Industrie, Nanterre (FR)

( * ) Notice: Subject to any disclaimer, the term of this patent is extended or adjusted under 35 U.S.C. 154(b) by 962 days.

(21) Appl. No.: 13/390,739

(22) PCT Filed: Aug. 24, 2010

(86) PCT No.: PCT/FR2010/051764
§ 371 (c)(1),
(2), (4) Date: Sep. 8, 2012

(87) PCT Pub. No.: WO2011/023899
PCT Pub. Date: Mar. 3, 2011

(65) Prior Publication Data
US 2013/0075955 A1    Mar. 28, 2013

(30) Foreign Application Priority Data
Aug. 28, 2009  (FR) ...................... 09 55886

(51) Int. Cl.
| B29C 33/06 | (2006.01) |
| B29C 45/14 | (2006.01) |
| B29C 69/02 | (2006.01) |
| B29C 45/73 | (2006.01) |
| B29K 711/14 | (2006.01) |
| B29C 35/08 | (2006.01) |

(52) U.S. Cl.
CPC ............. *B29C 33/06* (2013.01); *B29C 45/1418* (2013.01); *B29C 45/14778* (2013.01); *B29C69/02* (2013.01); *B29C 45/73* (2013.01); *B29C 2035/0811* (2013.01); *B29C 2045/14286* (2013.01); *B29K 2711/14* (2013.01)

(58) Field of Classification Search
CPC .... B29C 33/06; B29C 45/1418; B29C 14/73; B29C 2045/14286
See application file for complete search history.

(56) References Cited

U.S. PATENT DOCUMENTS

| 2004/0188427 A1* | 9/2004 | Huang | .................... B29C 33/02 |
| | | | 219/667 |
| 2007/0224433 A1* | 9/2007 | Saitou | ................. B29C 45/1418 |
| | | | 428/480 |

(Continued)

FOREIGN PATENT DOCUMENTS

| EP | 1886787 A1 | 2/2008 |
| EP | 1995034 A2 | 11/2008 |

(Continued)

OTHER PUBLICATIONS

International Search Report for PCT/FR2010/051764, dated Jan. 12, 2011, 3 pages.
Written Opinion for PCT/FR2010/051764, dated Jan. 12, 2011, 5 pages.

*Primary Examiner* — James Sanders
(74) *Attorney, Agent, or Firm* — Reising Ethington P.C.

(57) ABSTRACT

The invention relates to a method consisting in: inserting the coating (6) into a shaping and injection-molding mold (14); closing the mold (14) such that the coating (6) is shaped against a shaping surface (22) of the mold (14) as the mold (14) is closed; and, subsequently, overmolding the substrate (4) by injecting a plastic material into the mold (14). According to one aspect of the invention, the shaping surface (22) is induction-heated in order to thermoform the coating (6) as the mold (14) is closed, by generating induced currents that propagate along the shaping surface (22), and the induction heating is stopped in order to set the plastic material.

20 Claims, 3 Drawing Sheets

(56) References Cited

U.S. PATENT DOCUMENTS

2007/0267405 A1* 11/2007 Feigen-Blum et al. ....... 219/601
2009/0074905 A1*  3/2009 Matsen ................... B29C 33/06
                                                   425/547
2010/0276075 A1* 11/2010 Manzoni et al. .............. 156/245

FOREIGN PATENT DOCUMENTS

| | | |
|---|---|---|
| FR | 2867939 A1 | 9/2005 |
| JP | 8080532 | 3/1996 |
| WO | WO2009/019102 | 2/2009 |

* cited by examiner

METHOD FOR PRODUCING AN INTERIOR TRIM FOR A MOTOR VEHICLE, INCLUDING A SUBSTRATE AND A COATING HAVING THE APPEARANCE OF WOOD

TECHNICAL FIELD

The present invention relates to a method for producing an interior trim for a motor vehicle, including a plastic substrate and a decorative coating having a wood layer and covering the substrate, of the type in which the coating is inserted into a shaping and injection-molding mold, the mold is closed so that the coating is shaped against a shaping surface of the mold due to the closing of the mold, then the substrate is overmolded by injecting a plastic material into the mold.

BACKGROUND

U.S. Pat. No. 6,887,413 describes a method for producing an interior trim for a motor vehicle, in which a decorative coating comprising a sheet of natural wood is cut and shaped by the closing of the mold, then overmolded by the plastic material injected into the mold to form the substrate.

Nevertheless, it is difficult to perform the shaping of the decorative coating and the overmolding of plastic on that coating in a same mold under satisfactory conditions for both operations, making it possible to obtain interior trim of suitable quality and with a low production cost.

One aim of the invention is to propose a production method making it possible to improve the production quality and reduce the production costs of an interior trim comprising a substrate made from a plastic material and a decorative coating comprising a layer of wood.

SUMMARY

To that end, the invention proposes a method of the aforementioned type, characterized in that the shaping surface is induction-heated in order to thermoform the coating as the mold is closed, by generating induced currents that propagate along the shaping surface, and the induction heating is stopped in order to set the plastic material.

According to other embodiments, the method comprises one or more of the following features, considered alone or according to all technically possible combinations:
  the induction heating is stopped before injecting the plastic;
  the shaping surface is heated to a temperature comprised between 60° C. and 150° C. for the thermoshaping of the coating;
  the trim is cooled to a temperature comprised between −5° C. and 60° C. in order to set the plastic material;
  the shaping surface is defined on an insert of a mold part inserted into a surface of a support element of the mold part configured to generate the circulation of induced currents in the support element at said surface of the support element;
  the insert has an electrical resistivity and/or a magnetic permeability different from that or those of the support element;
  the mold is closed at a closing speed comprised between 0.5 mm/min and 1 mm/s during a final closing phase; and
  the mold is closed at a closing speed comprised between 0.5 mm/min and 1 mm/s when the distance between the mold parts is comprised between 5 mm and 10 mm relative to the closed position.

BRIEF DESCRIPTION OF THE DRAWINGS

The invention will be better understood upon reading the following description, provided solely as an example, and done in reference to the appended drawings, in which.

DETAILED DESCRIPTION OF THE ILLUSTRATED EMBODIMENTS

Figure 1:
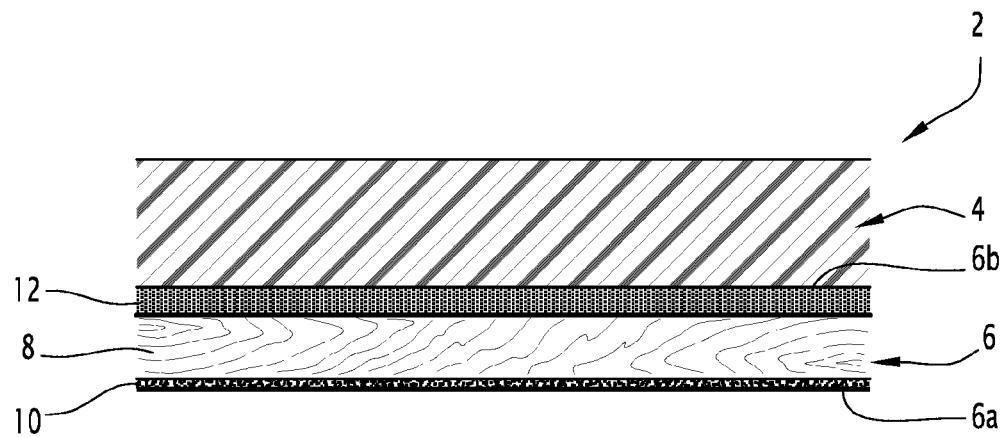
FIG. 1 is a partial cross-sectional view of an interior trim of a motor vehicle comprising a plastic substrate and a decorative coating.

As shown in FIG. 1, the interior trim 2 for a motor vehicle comprises a plastic substrate 4 and a coating, or covering, 6 at least partially covering the substrate 4.

The coating 6 is positioned on the visible surface of the trim 2. It comprises a visible front face 6a facing the side opposite the substrate 4, and a rear face 6b in contact with the substrate 4.

The coating 6 comprises at least one wood layer 8 made from natural wood.

As shown in FIG. 1, the coating 6 comprises a single wood layer 8. Optionally, the coating 6 comprises several wood layers 8 that are superimposed and adhered to one another.

As shown in FIG. 1, the coating 6 comprises a protective layer 10 covering the wood layer 8 on the side of the front face 6a.

The protective layer 10 serves to protect the wood layer 8, in particular from ultraviolet rays that may cause accelerated aging of the wood layer 8. The protective layer 10 is for example a synthesis resin, for example a varnish, and is colored, transparent or translucent.

The protective layer 10 is for example applied by projection on the front of the wood layer 8.

The coating 6 comprises a flexible reinforcing layer 12 covering the wood layer 8 on the side of the rear face 6b.

The reinforcing layer 12 serves to reinforce the wood layer 8 on the other side thereof, and potentially to favor the connection of the coating 6 with the substrate 4 during overmolding of the latter on the other side of the coating 6.

The reinforcing layer 12 is for example a layer of a textile material, in particular a fabric or a nonwoven, a paper, or a sheet of rubber.

The reinforcing layer 12 is for example laminated on the other side of the wood layer 8.

Such a coating 6 is sometimes called a stratified wood complex due to the superposition of layers including a wood layer, in particular a sheet of natural wood.

The method for producing the trim 2 is described below in reference to FIGS. 2 to 6.

As illustrated in FIGS. 2 to 6, an injection-molding mold 14 comprises an upper mold portion 16 and a lower mold portion 18 that are complementary and move relative to one another to open the mold 14 by separating the upper 16 and lower 18 parts and close the mold 14 by bringing the upper 16 and lower 18 parts closer together.

Figure 3:
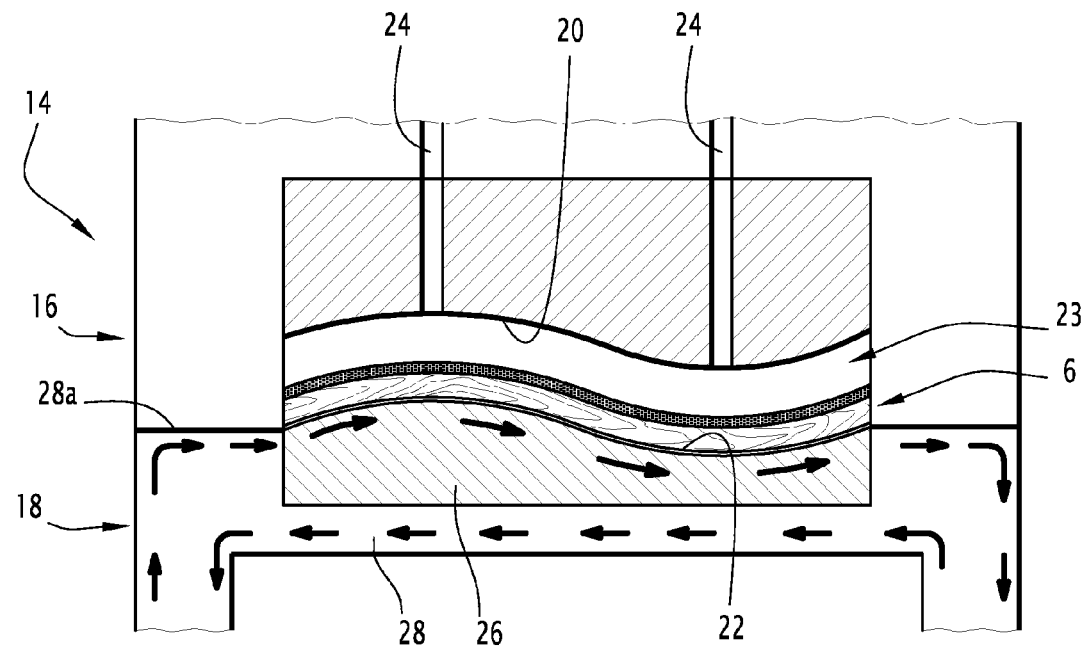
Figure 4:
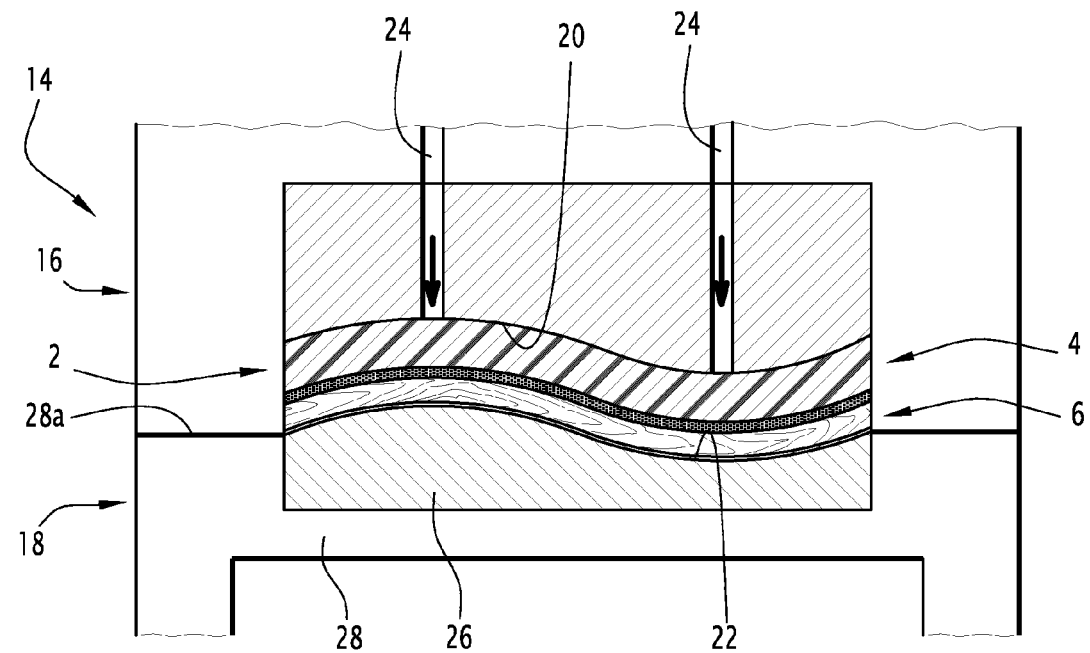
Figure 5:
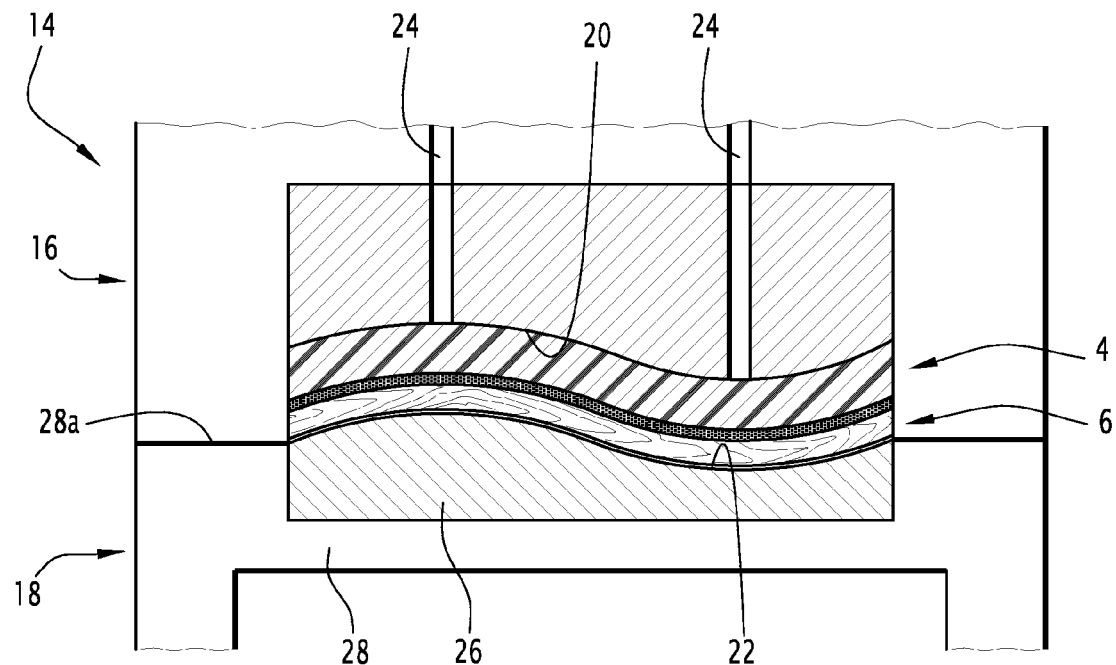
Figure 6:
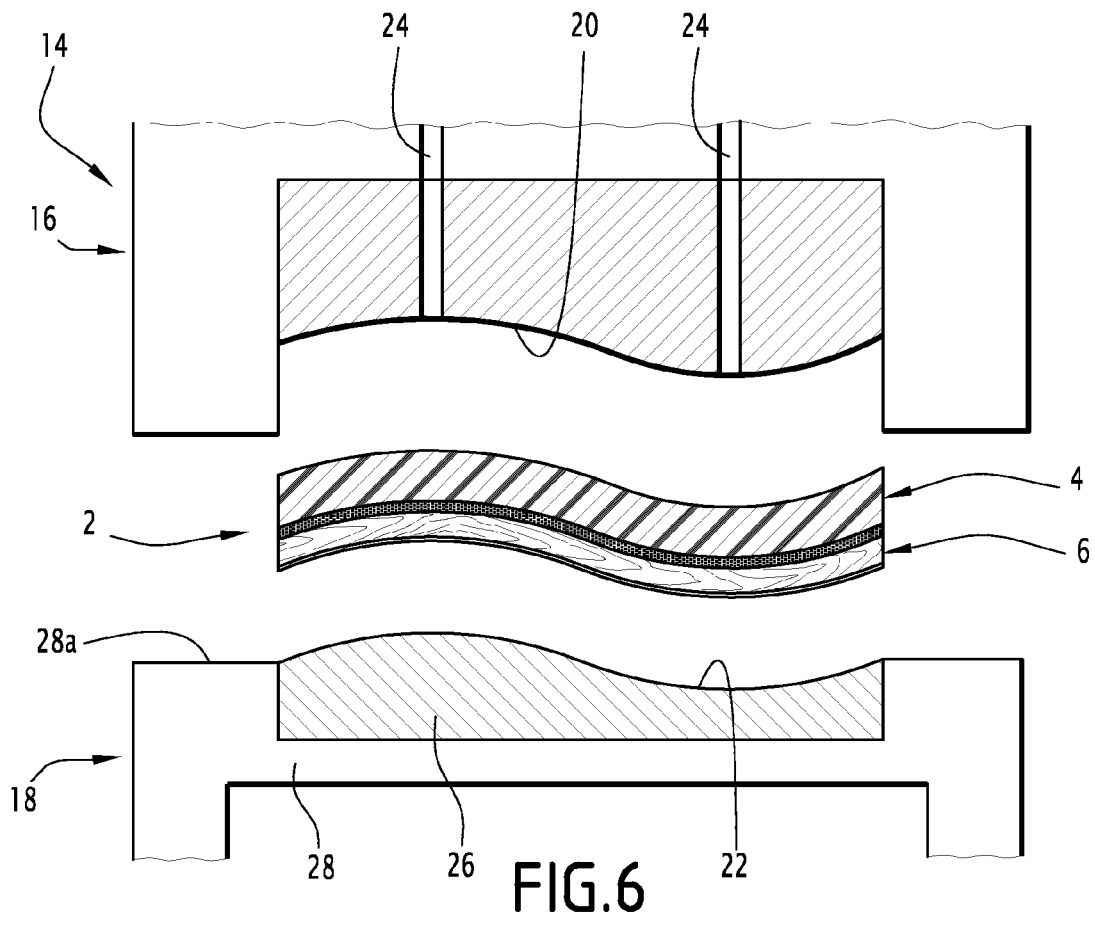

The upper part 16 and the lower part 18 comprise opposite surfaces 20, 22 respectively, defining a cavity 23 for receiving the coating 6 and molding the substrate 4 when the mold 14 is closed (of FIG. 3).

The upper part 16 comprises intake channels 24 to inject melted plastic into the cavity 23. The intake channels 24 emerge on the surface 20 of the upper part 16 defining a mold surface.

The surface 22 of the lower part 18 is provided to shape the coating 6 applied by pressing against the surface 22. The surface 22 is hereafter called the shaping surface 22. It has a three-dimensional shape corresponding to the desired final three-dimensional shape of the coating 6. The shaping surface 22 can in particular be a non-developable surface.

The mold 14 comprises a device for heating the shaping surface 22 making it possible to heat the shaping surface 22 locally, i.e. in a limited thickness of material from the shaping surface 22.

The heating device is an induction heating device provided to cause the induced currents (or Foucault currents) to circulate locally along the shaping surface 22.

Figure 2:
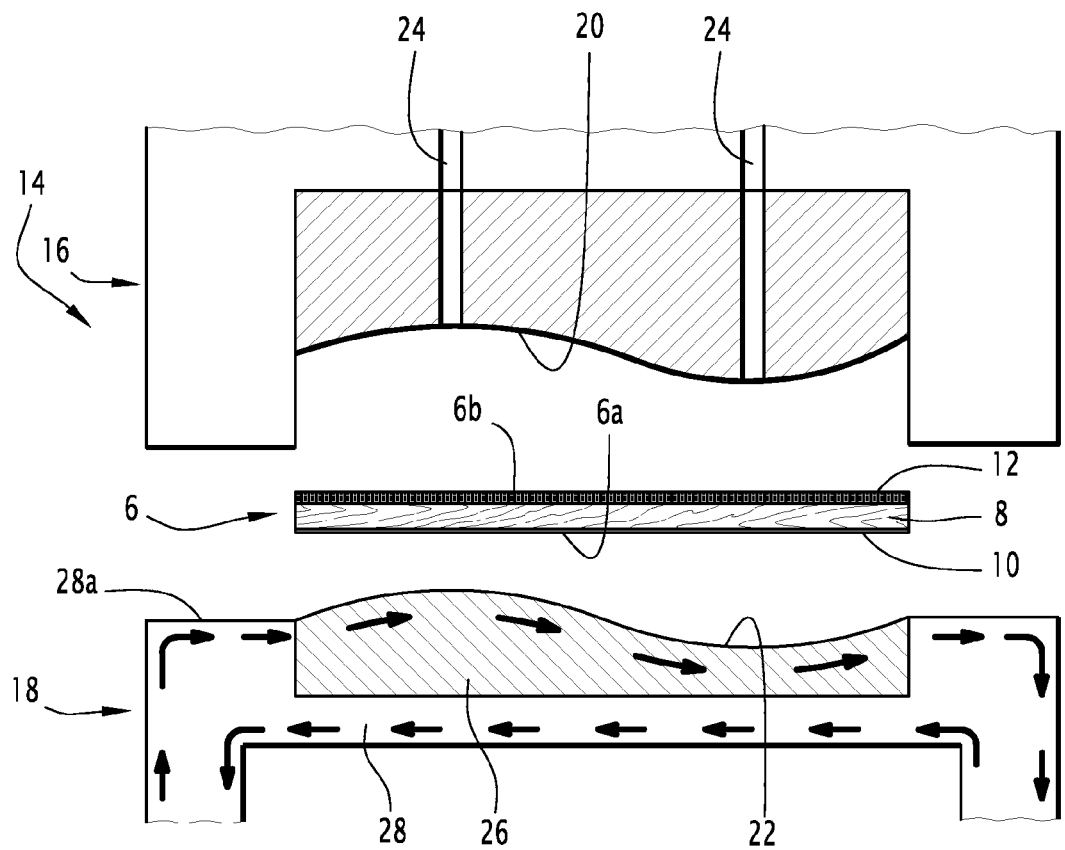
FIGS. 2 to 6 are diagrammatic cross-sectional views of an injection-molding mold, illustrating different steps of a method for producing the trim of FIG. 1, according to the invention.

The heating device comprises electromagnetic inductors provided to generate a variable electromagnetic field in the lower part 18, causing the circulation of the induced currents along the shaping surface 22, as illustrated in FIGS. 2 and 3.

The lower part 18 and the heating device are for example made according to the teaching of patent application FR 2,867,939, filed by the company ROCTOOL. For the sake of clarity of the drawings, the inductors are not shown.

Thus, as illustrated in FIGS. 2 to 6, the lower part 18 for example comprises an insert 26 on which the shaping surface 22 is defined, the insert 26 being inserted into an outer surface 28a of the support element 28 configured to generate the circulation of induced currents by the electromagnetic inductors on the outer surface 28a of the support element 28, and consequently on the shaping surface 22 of the insert 26. The circulation of the induced currents is illustrated by arrows in FIGS. 2 and 3.

Alternatively, and as indicated in FR 2,867,939, the support element 28 can be configured so that the surface receiving the insert is an inner surface of the support element 28.

The insert 26 and the support element 28 are made from ferromagnetic materials allowing the formation of induced currents.

Advantageously, the insert 26 is made from a different material from that of the support element 28, producing greater heat during the circulation of induced currents. The insert 26 for example has an electrical resistivity and/or a magnetic permeability different from that or those of the support element 28.

Traditionally, the mold 14 comprises a cooling device to regulate the temperature of the heated upper 16 and lower 18 parts due to the injection operations for injecting melted plastic.

In a known manner, this cooling device comprises conduits for the circulation of a cooling fluid passing through the upper 16 and lower 18 parts.

In the case of a lower part 18 comprising an insert 26 and a support element 28, cooling conduits circulate in the support element 28, and in particular in the insert 26.

According to the production method, the mold 14 is open (FIG. 2) and the coating 6, for example initially substantially flat, is introduced between the upper 16 and lower 18 parts. The front face 6a faces the shaping surface 22, and the rear face 6b faces the molding surface 20. The shaping surface 22 is heated by the circulation of induced currents up to a temperature comprised between 60° C. and 150° C. The induced currents are caused during a period comprised between 5 and 200 seconds.

After or during the heating of the shaping surface 22, the mold 14 is closed (FIG. 3). In so doing, the upper part 16 presses the coating 6 against the heated shaping surface 22, so that the coating 6 is thermoformed against the shaping surface 22.

During the final closing phase of the mold 14, the mold 14 is closed at a slow closing speed allowing the exchange of calories between the insert 26 and the coating 6 so that the coating 6 has time for the temperature to rise between 60° C. and 150° C.

The closing speed—variation of the distance between the mold parts 16, 18 as a function of time—is kept between 0.5 mm/min and 1 mm/s from a distance between the parts of the mold 16, 18 comprised between 5 mm to 10 mm relative to the closing position, and until closing of the mold 14.

In the closed position of the mold 14, an injection space is formed between the other side of the coating 6 and the mold surface 20 for the injection of the substrate 4. The intake channels 24 emerge in this injection space.

Then, the heating of the shaping surface 22 is stopped and the plastic is injected through the intake channels 24, so as to injection mold the substrate 4.

Alternatively or optionally, it is possible to consider injecting the plastic when the mold 14 is not yet completely closed.

Stopping the heating makes it possible to cool the shaping surface 22 and the coating 6 as far as a temperature range making it possible for the injected plastic to set.

The heating of the shaping surface 22 is preferably stopped before the plastic injection. Alternatively, the heating of the shaping surface 22 is stopped during or after injection, and in any case before opening the mold 14 for stripping.

The plastic is injected at a high temperature, comprised between 100 and 270° C.

After the heating of the shaping surface 22 is stopped, one waits for the trim 2 to cool to a suitable temperature making it possible to strip it from the substrate 4. One for example waits for the trim 2 to cool to a temperature below 60° C., for example comprised between −5° C. and +60° C.

The cooling device is provided to keep the upper 16 and lower 18 parts within a temperature range suitable for the production of trims, for example between −5° C. and +60° C., throughout the production method.

Preferably, the cooling of the lower part 18 is at least partially deactivated during the induction heating of the shaping surface 22. For example, in the illustrated embodiment, the cooling of the insert 26 can be deactivated and the cooling of the support element 28 can be deactivated or kept active during the induction heating of the shaping surface 22.

Alternatively, the cooling of the lower part 18 is kept active during the induction heating of the shaping surface 22 if the heating device allows the temporary local heating of the shaping surface 22 during the thermoforming of the coating 6 against the cooling device.

The localized induction heating of the shaping surface 22 makes it possible to heat only the shaping surface 22 of the mold 14 necessary for the thermoforming of the coating 6 under satisfactory conditions given the quality of the trim 2. The thermoforming must in particular be done by limiting the breaks of the fibers of the wood coating 6 layer 8.

Furthermore, the localized induction heating of the shaping surface 22 allows faster heat cycles (heating/cooling) of the heated part. As a result, the injection of the substrate and its cooling to a stripping temperature can be done during a short period of time after the thermoforming, which ensures a high production rhythm and reduces the production cost, and under conditions that are satisfactory for the production of high-quality injection molding. The mold remains closed from the thermoforming to the injection of the plastic and the cooling thereof to a stripping temperature.

Thus, the production method according to the invention makes it possible to overmold a substrate on a coating having the appearance of wood to form an interior trim for a motor vehicle in mass production at a low cost and with satisfactory quality.

The invention claimed is:

1. A method for producing an interior trim for a motor vehicle, interior trim including a plastic substrate and a decorative coating having a wood layer and covering the substrate, the method comprising the steps of:
   inserting the coating into a shaping and injection-molding mold having a shaping surface,
   closing the mold so that the coating is shaped against the shaping surface due to the closing of the mold, with induction heating of the shaping surface as the mold is closed in order to thermoform the coating, the shaping surface being heated to a first temperature range,
   then overmolding the substrate onto the shaped coating by injecting a plastic material into the closed mold, while a cooling device keeps the mold within a second temperature range different from the first temperature range,
   the induction heating being stopped before or during the injection of the plastic in order to set the plastic material.

2. The method according to claim 1, wherein the induction heating is stopped before injecting the plastic material.

3. The method according to claim 1, wherein the shaping surface is heated to a temperature comprised between 60° C. and 150° C. for the thermoforming of the coating.

4. The method according to claim 1, wherein the trim is cooled to a temperature comprised between −5° C. and 60° C. in order to set the plastic material.

5. The method according to claim 1, wherein the shaping surface is defined on an insert of a mold part inserted into a surface of a support element of the mold part configured to generate the circulation of induced currents in the support element at said surface of the support element.

6. The method according to claim 5, wherein the insert has an electrical resistivity and/or a magnetic permeability different from that or those of the support element.

7. The method according to claim 1, wherein the mold is closed at a closing speed comprised between 0.5 mm/min and 1 mm/s during a final closing phase.

8. The method according to claim 1, wherein the mold is closed at a closing speed comprised between 0.5 mm/min and 1 mm/s when the distance between the mold parts is comprised between 5 mm and 10 mm relative to the closed position.

9. A method for producing an interior trim for a motor vehicle, comprising the steps of:
   inserting into an injection-molding mold a covering having a plurality of layers including at least one wood layer;
   closing the mold so that the covering is positioned against a shaping surface of the mold;
   shaping the covering using induction heating of the shaping surface, the shaping surface being heated to a first temperature range;
   forming a substrate on a side of the covering opposite the shaping surface by injecting a plastic into the mold, while a cooling device keeps the mold within a second temperature range different from the first temperature range; and
   stopping the induction heating, before or during the injection of the plastic, thereby permitting cooling of the covering and substrate.

10. The method according to claim 9, wherein the shaping step further comprising shaping the covering using induction heating of the shaping surface by generating induced currents that propagate along the shaping surface.

11. The method according to claim 9, wherein the step of stopping the induction heating is carried out prior to the forming step.

12. The method according to claim 9, wherein the shaping step further comprises induction heating the shaping surface to temperature between 60° C. and 150° C.

13. The method according to claim 12, further comprising the step of cooling the plastic material so that it reaches a temperature of between −5° C. and 60° C. after stopping the induction heating.

14. The method according to claim 9, wherein the shaping surface is a surface of an insert located on a support element of the mold, and wherein the shaping step further comprises generating the circulation of induced currents in the support element and insert.

15. The method according to claim 14, wherein the insert has an electrical resistivity and/or a magnetic permeability different from that or those of the support element.

16. The method according to claim 1, wherein the shaping surface is heated to a temperature between 60° C. and 150° C. for the thermoforming of the coating, and then the trim is cooled to a temperature between −5° C. and 60° C. in order to set the plastic material.

17. A method for producing an interior trim for a motor vehicle, the interior trim having a covering with a final three-dimensional shape, the method comprising the steps of:
   inserting into an injection-molding mold a covering comprising at least one wood layer;
   induction heating of a shaping surface of the mold;
   closing the mold so that the mold presses the covering against a shaping surface of the mold, the covering being shaped to the final three-dimensional shape against the induction heated shaping surface;
   injecting a plastic material into the mold to form a substrate on a side of the covering opposite the shaping surface after the covering is shaped to the final three-dimensional shape while the mold presses the covering; and
   stopping the induction heating, thereby permitting cooling of the covering and substrate.

18. The method according to claim 17, wherein the mold is closed at a closing speed between 0.5 mm/min and 1 mm/s during a final closing phase.

19. The method according to claim 18, wherein the final closing phase concludes when the mold is closed.

20. The method according to claim 7, wherein the final closing phase concludes when the mold is closed.

* * * * *